(12) United States Patent
Godon et al.

(10) Patent No.: US 10,137,640 B2
(45) Date of Patent: Nov. 27, 2018

(54) METHOD FOR ADHERING PARTS AND DEVICE FOR IMPLEMENTING SAID METHOD

(71) Applicant: SNECMA, Paris (FR)

(72) Inventors: Thierry Godon, Moissy-Cramayel (FR); Julien Schneider, Moissy-Cramayel (FR); Franck Bernard Leon Varin, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 114 days.

(21) Appl. No.: 15/101,754

(22) PCT Filed: Nov. 28, 2014

(86) PCT No.: PCT/FR2014/053088
§ 371 (c)(1),
(2) Date: Jun. 3, 2016

(87) PCT Pub. No.: WO2015/082813
PCT Pub. Date: Jun. 11, 2015

(65) Prior Publication Data
US 2017/0001366 A1    Jan. 5, 2017

(30) Foreign Application Priority Data
Dec. 4, 2013 (FR) ...................................... 13 62111

(51) Int. Cl.
*B29C 65/00* (2006.01)
*B29C 65/48* (2006.01)
(Continued)

(52) U.S. Cl.
CPC ............ *B29C 65/48* (2013.01); *B29C 66/532* (2013.01); *B29C 66/721* (2013.01); *F01D 5/282* (2013.01);
(Continued)

(58) Field of Classification Search
CPC ....... B29C 65/02; B29C 65/026; B29C 65/26; B29C 65/4815; B29C 65/70; B29C 70/72;
(Continued)

(56) References Cited

U.S. PATENT DOCUMENTS

2007/0062641 A1   3/2007   Beehag et al.
2008/0277049 A1   11/2008  Roebroeks et al.

FOREIGN PATENT DOCUMENTS

EP    1 767 335 A2     3/2007
WO    2007/035100 A2   3/2007

OTHER PUBLICATIONS

International Search Report dated Mar. 17, 2015 in PCT/FR2014/053088 Filed Nov. 28, 2014.
(Continued)

*Primary Examiner* — Mark A Osele
*Assistant Examiner* — Nickolas Harm
(74) *Attorney, Agent, or Firm* — Oblon, McClelland, Maier & Neustadt, L.L.P.

(57) ABSTRACT

A method is provided of bonding together at least two parts. The method includes assembling together at least two parts and at least one adhesive layer, the adhesive being configured so that its adhesive power increases on heating as a result of it polymerizing, at least one of the parts being made of composite material or of metal, the adhesive layer being present, after assembly, between the parts, the assembled together parts and the adhesive being present in a chamber defined by a wall, the wall having an inside face situated facing a first part present between the adhesive layer and the
(Continued)

wall, the first part being intended to be bonded to a second part and only a fraction of the second part being present inside the chamber; and applying a liquid against the wall on its side opposite from the chamber.

13 Claims, 4 Drawing Sheets

(51) Int. Cl.
  *F16B 11/00*   (2006.01)
  *F04D 29/32*   (2006.01)
  *F04D 29/02*   (2006.01)
  *B29C 70/84*   (2006.01)
  *B29C 70/72*   (2006.01)
  *B29C 65/70*   (2006.01)
  *B29C 65/02*   (2006.01)
  *B29C 65/18*   (2006.01)
  *B29C 65/26*   (2006.01)
  *B29L 31/08*   (2006.01)
  *F01D 5/14*    (2006.01)
  *F01D 5/28*    (2006.01)

(52) U.S. Cl.
  CPC .......... *F04D 29/023* (2013.01); *F04D 29/324* (2013.01); *F16B 11/006* (2013.01); *B29C 65/02* (2013.01); *B29C 65/026* (2013.01); *B29C 65/18* (2013.01); *B29C 65/26* (2013.01); *B29C 65/4815* (2013.01); *B29C 65/4835* (2013.01); *B29C 65/70* (2013.01); *B29C 66/1122* (2013.01); *B29C 66/301* (2013.01); *B29C 66/742* (2013.01); *B29C 66/81459* (2013.01); *B29C 70/72* (2013.01); *B29C 70/84* (2013.01); *B29L 2031/08* (2013.01); *F01D 5/147* (2013.01); *F01D 5/288* (2013.01); *F05D 2230/23* (2013.01); *F05D 2300/603* (2013.01); *Y10T 156/1002* (2015.01); *Y10T 156/103* (2015.01); *Y10T 156/1031* (2015.01)

(58) Field of Classification Search
  CPC ................ B29C 70/84; Y10T 156/103; Y10T 156/1031
  USPC ......... 156/198, 228, 245, 285, 303.1, 304.1, 156/493, 500
  See application file for complete search history.

(56) References Cited

OTHER PUBLICATIONS

French Search Report dated Sep. 3, 2014 in French Patent Application FR 1362111 Filed Dec. 4, 2013.

METHOD FOR ADHERING PARTS AND
DEVICE FOR IMPLEMENTING SAID
METHOD

BACKGROUND OF THE INVENTION

The invention relates to methods of adhesively bonding parts together and to devices for performing the method.

Adhesively bonding a metal leading edge on a turbine engine blade made of composite material is a technical operation that can be relatively complex. Such bonding may involve an operation of placing the layer of adhesive between the two substrates, and raising temperature, while also applying pressure to condition the adhesive layer correctly. It may also be necessary to maintain both the temperature and the pressure for a certain length of time that is sufficient to polymerize the material used in the adhesive layer.

Imposing a constant pressure together with a rise in temperature on an adhesive layer having a complex three-dimensional shape can be relatively difficult to achieve.

One solution for solving this problem is to make special molds in which the thickness of the adhesive layer is not constant. Nevertheless, the parts obtained by using that solution may fail to have satisfactory mechanical properties.

The same difficulties can be encountered when adhesively bonding other types of part, such as for example:

bonding a metal leading or trailing edge on an outlet guide vane;

bonding metal hollow outlet guide vanes; or bonding metal reinforcing sectors on flanges of an axisymmetric casing made of composite material.

Consequently, there exists a need to obtain novel methods of bonding parts together that enable a constant pressure to be imposed on the adhesive layer throughout the fabrication cycle.

There also exists a need to obtain novel methods of bonding parts together presenting reduced operating costs.

There also exists a need to obtain novel methods of bonding parts together enabling the thickness of the resulting adhesive layer to be controlled in satisfactory manner, and for example enabling an adhesive layer to be obtained that is of thickness that is as constant as possible.

There also exists a need to obtain novel methods of bonding parts together that enable the parts for bonding and the adhesive to be subjected to a temperature that is as uniform and as constant as possible.

There also exists a need to obtain novel devices specially adapted to performing these methods.

OBJECT AND SUMMARY OF THE INVENTION

For this purpose, in a first aspect, the invention provides a method of bonding together at least two parts, the method comprising the following steps:

a) assembling together at least two parts and at least one adhesive layer, at least one of the parts being made of composite material or of metal, the adhesive layer being present, after assembly, between the parts, the assembled together parts and the adhesive being present in a chamber defined by a wall, the wall having an inside face situated facing a first part present between the adhesive layer and the wall; and b) applying a liquid against the wall on its side opposite from the chamber, the applied liquid imposing pressure on the parts, the wall being configured so that, at least after application of the liquid, its inside face has the same shape as the first part, the parts being bonded together by means of the adhesive layer as a result of performing steps a) and b).

Applying pressure by means of a liquid through the wall and the fact that the wall already has or takes on the shape of at least one of the parts for bonding advantageously makes it possible to have a bonding method in which a constant pressure is applied to the adhesive, regardless of the shape of the parts to be bonded together.

In addition, the present invention advantageously makes it possible to have a bonding method available that can be implemented at a cost that is significantly lower than that of prior art bonding methods.

Thus, in the invention, at least after the liquid has been applied, the inside face of the wall has the same shape as the face of the first part situated facing the wall.

In an implementation, the inside face of the wall may also be situated facing a second part to which the first part is to be bonded. Under such circumstances, it would not go beyond the ambit of the present invention for the inside face of the wall, at least after the liquid has been applied, to have the same shape as the face of the first part situated facing the wall and as a portion of a face of a second part to which the first part is to be bonded.

In an implementation, the parts may be present inside the chamber in full. In a variant, at least one of the parts may be present inside the chamber in part only.

In an implementation, the parts and the adhesive may initially be assembled together and then the wall may be positioned so as to define the chamber in which the assembled-together parts and the adhesive are present. In a variant, the wall may initially be positioned so as to define the chamber, and then the parts and the adhesive may be assembled together.

In an implementation, during step b), the liquid may be inserted into a cavity, the wall being situated between the chamber and the cavity. Under such circumstances, the cavity into which the liquid is inserted may be defined by one or more rigid cavity walls, i.e. walls that do not deform while the liquid is being applied.

In an implementation, the parts may be present on a support prior to step b). The support may define the cavity into which the liquid is inserted during step b). The support may be rigid.

The term "rigid support" should be understood as meaning that the support presents sufficient rigidity to avoid being deformed as a result of the liquid being applied against the wall.

In an implementation, the chamber may be defined between the wall and the support defining the cavity into which the liquid may be inserted during step b), the parts being present on the support before step b).

In an implementation, the inside face of the wall may retain its shape during application of the liquid. Under such circumstances, prior to application of the liquid, the inside face of the wall presents the same shape as the first part. Still under such circumstances, and, as a result of the liquid being applied, the inside face of the wall retains its shape during the bonding method of the invention and in particular while it is pressing against the parts for bonding together.

In an implementation, the wall may be compressed as a result of the liquid being applied while its inside face conserves its shape. The compression of the wall may advantageously be elastic. By way of example, the compression of the wall may result in the thickness of the wall decreasing by an amount less than or equal to 0.1%.

Unless mentioned to the contrary, the thickness of the wall is defined as the smallest transverse dimension of the wall.

In an implementation, the wall is such that it is not compressed as a result of the liquid being applied. Thus, in an implementation, the wall need not be subjected to any deformation as a result of the liquid being applied.

When the wall is such that its inside face retains its shape, the wall may preferably present a Young's modulus lying in the range 1 gigapascal (GPa) to 250 GPa, preferably in the range 50 GPa to 200 GPa.

When the wall is such that its inside face retains its shape, the wall may include, and in particular may be constituted by, a material selected from: metal alloys, e.g. steel, pure metals, e.g. aluminum, titanium, glasses, composite materials with thermosetting resin or thermoplastic resin or ceramic resin (i.e. resin filled with a ceramic powder), optionally reinforced organic resins, thermosetting resins or thermoplastic resins, ceramics, e.g. alumina, solid materials in the form of foams, and mixtures thereof.

In a variant, the shape of the inside face of the wall may change on application of the liquid. Under such circumstances, after application of the liquid, the inside face of the wall takes on the shape of the first part. Once the inside face of the wall is pressed against the parts for bonding together as a result of the liquid being applied, it may retain its shape.

When the wall is such that the shape of its inside face changes on application of the liquid, the wall may include, and in particular may be constituted by, a material selected from: optionally reinforced silicones, thermoplastic polymers, e.g. polyamides, polyethylene terephthalate (PET), Teflon® (PTFE), or polyimide, and mixtures thereof (this list not being exhaustive).

In an implementation, prior to step b), the wall may already apply pressure on the parts. By way of example, prior step b), the wall may be in contact with at least one of the parts. In a variant, none of the parts is subjected to pressure applied by the wall prior to step b). Thus, in an implementation, it is possible for none of the parts to be in contact with the wall before step b).

All or part of the wall may move as a result of the liquid being applied.

The wall may advantageously be impermeable to the applied liquid. Thus, the liquid that is applied against the wall preferably does not penetrate into the chamber.

In an implementation, the pressure imposed by the liquid on the parts may be greater than 4 bars, e.g. greater than or equal to 5 bars, e.g. greater than or equal to 6 bars, e.g. greater than or equal to 7 bars, e.g. greater than or equal to 8 bars.

In an implementation, after step b), the method may include a step c) of heating the adhesive layer.

Step c) serves advantageously to increase the adhesive power of the adhesive by polymerizing it, thereby increasing the cohesion between the parts. When step c) is performed, it is possible to obtain bonding after performing steps a), b), and c). By way of example, it is possible to use a heat-activated adhesive. The adhesive used may be thermosetting. Nevertheless, the invention is not limited to using adhesives presenting adhesive power that is increased by heating.

Advantageously, step c) may be performed while the parts are being subjected to the pressure applied by the liquid.

During step c), the temperature of the adhesive layer may increase by at least 20° C., e.g. by at least 160° C., e.g. by at least 300° C. For example, the temperature of the adhesive layer may increase by at least 300° C. for an adhesive of the bismaleimide type and by at least 20° C., or indeed at least 160° C. for an adhesive of the epoxy type. In an implementation, for an epoxy type adhesive, the temperature of the adhesive layer during step c) may be raised to 150° C. In an implementation, for a bismaleimide type adhesive, the temperature of the adhesive layer during step c) may be raised to 250° C.

During step c), the temperature of the applied liquid may increase by at least 180° C., e.g. by at least 350° C.

Advantageously, some or all of the applied liquid does not change state during step c).

In an implementation, step c) may be performed while the parts are present in the enclosure of a heater device, e.g. in the enclosure of a stove or of an autoclave.

Nevertheless, it can be advantageous for step c) not to be performed within an autoclave. This makes it possible, advantageously, to retain low cost for implementing the method of the invention.

In an implementation, the liquid may be heated prior to being applied against the wall, the heating of the adhesive layer then being performed after step b) as a result of putting the heated liquid into the proximity of the adhesive layer. In a variant, a heater member performing heating throughout part or all of step c) may be present in the cavity into which the liquid is inserted during step b) and/or in the support defining the cavity and/or in the wall and/or on the wall and/or in the chamber.

Such characteristics advantageously make it possible to obtain heating that is uniform and local and to avoid raising the parts for bonding together to temperatures that might damage them.

In addition, such local heating advantageously makes it possible to reduce the duration and the cost of the method of the invention.

The heater member performing the heating throughout part or all of step c) may preferably be present in the cavity into which the liquid is inserted during step b).

By way of example, the heater member may comprise one or more heater resistance elements.

By way of example, the adhesive may be selected from adhesives of the epoxy, bismaleimide, urethane, and acrylic types.

Prior to step b), the thickness of the adhesive layer present between the parts for bonding may be greater than or equal to 0.1 millimeters (mm) and/or less than 5 mm. Prior to step b), the thickness of the adhesive layer between the parts for bonding may lie in the range 0.5 mm to 1 mm, for example.

Unless mentioned to the contrary, the thickness of the adhesive layer corresponds to the smallest transverse dimension of the adhesive layer.

The materials used for constituting the wall are naturally suitable for use in the context of the method of the invention, and in particular they are compatible with the temperature at which the method of the invention is performed.

In an implementation, the wall may be constituted by a single material. In a variant, the wall may comprise a plurality of different materials.

The wall may be a single layer, or in a variant it may be a multilayer wall. The layer(s) constituting the wall may be in the form of film(s). In an implementation, the wall is in the form of a metal foil, e.g. comprising titanium, which foil may for example present a thickness of several tenths of a millimeter.

The thickness of the wall prior to performing step b) may lie in the range 0.5 mm to 50 mm, for example.

By way of example, the applied liquid may be selected from: water, oils, e.g. organic oils or silicone oils, and mixtures thereof.

In an implementation, a plurality of adhesive layers may be present on at least one of the parts, it being possible for the adhesive layers not to be in contact with one another, and each adhesive layer may be present between two parts for bonding together.

In an implementation, each adhesive layer may serve to bond a distinct part. Two parts bonded by two different adhesive layers may be identical or different.

In an implementation, the plurality of adhesive layers may comprise an identical adhesive. In a variant, the plurality of adhesive layers may comprise different adhesives, each of the adhesive layers comprising a respective different adhesive, for example. When a plurality of different adhesives are used, they present fabrication cycles in terms of pressure and temperature that are compatible.

In an implementation, at least two parts may be bonded onto a common part, with pressure being applied to each of said at least two parts by liquid acting through respective distinct walls.

In an implementation, the wall may move during step b) and the movement of all or part of the wall may be controlled during step b) by a member for limiting the movement of the wall.

Such a characteristic advantageously makes it possible to control the thickness of the adhesive layer that is obtained between the parts for bonding together.

In an implementation, the wall may be in the form of a membrane configured to deform as a result of the liquid being applied, with one or more stiffener elements being fastened to the membrane, e.g. adhesively.

The stiffener elements may be present on one side only of the membrane, or in a variant on both sides of the membrane. The stiffener elements may be present beside the chamber and/or on the side opposite from the chamber.

By way of example, the stiffener elements may be in the form of a set of reinforcing fibers, which reinforcing fibers may be made of glass, for example. The stiffener element may be a separate fitted part. For example, the stiffener element may be in the form of a metal element that is bonded to silicone or embedded therein.

By way of example, the stiffener element(s) may serve to form a punch against at least one of the parts for bonding together.

In an implementation, an impermeable membrane may cover the wall and the wall may be situated between the chamber and the impermeable membrane, with the liquid being applied against the impermeable membrane on its side opposite from the chamber.

The impermeable membrane may cover the wall in full or in part. In an implementation, the impermeable membrane may already be in contact with the wall, even before the liquid is applied. In a variant, the impermeable membrane is put into contact with the wall as a result of the liquid being applied. In another variant, an intermediate layer may be present between the wall and the impermeable membrane so as to prevent contact between the wall and the impermeable membrane.

In an implementation, the impermeable membrane may include, and in particular may be constituted by, a material selected from: optionally reinforced silicones, thermoplastic polymers, e.g. polyamide, polyethylene terephthalate (PET), Teflon® (PTFE), and polyimide (this list not being exhaustive).

In an implementation, the parts may be made of composite material and may comprise fiber reinforcement together with a matrix.

In a variant, the parts may be made of metal.

In another variant, the first part may be made of metal and a second part to which the first part is to be bonded may be made of composite material and may comprise fiber reinforcement together with a matrix.

By way of example, the metal may be selected from: steel, titanium, aluminum, and SiC-titanium.

In an implementation, the first part may be an element for constituting, once bonded, a leading edge or a trailing edge, and a second part onto which the first part is to be bonded may be a turbine engine blade.

In an implementation, the first part is a metal reinforcing element, e.g. a metal reinforcing sector, and the second part is a flange of a casing made of composite material comprising fiber reinforcement together with a matrix.

In an implementation, after being bonded, the first part may constitute a sealing gasket, e.g. made of silicone, and the second part may be a part made of composite material or of metal.

In an implementation, at least one of the parts for bonding may be a hollow part. Under such circumstances, bonding may be performed on the inside portion and/or on the outside portion of the hollow part. The hollow part may optionally be axisymmetric.

The composite material parts used in the ambit of the present invention may include fiber reinforcement of any kind. By way of example, the fiber reinforcement may be woven fiber reinforcement, e.g. 3D woven fiber reinforcement. By way of example, the fiber reinforcement may comprise ceramic fibers, e.g. made of silicon carbide (SiC), alumina, and/or fibers made of carbon, glass, or aramid, or indeed fibers made of thermoplastic material.

The matrix of the above-mentioned composite materials may be made of ceramic, of carbon, of metal, or of organic material. By way of example, the matrix may be an epoxy matrix.

The present invention also provides a device for performing the above-defined method, the device comprising:
   a wall defining a chamber, the chamber defining an inside volume in which at least two parts are to be bonded together by means of at least one adhesive layer; and
   a liquid injection device configured to apply a liquid against the wall;
   the device being configured so that applying the liquid against the wall does not modify the shape of the inside face of the wall situated beside the chamber and generates sufficient pressure on the wall to move the wall and reduce the inside volume of the chamber.

In an embodiment, the device may include a support defining a cavity into which the liquid is to be inserted. In an embodiment, the chamber may be defined between the wall and the support defining the cavity in which the liquid is to be inserted.

In an embodiment, the device may further include a heater member, the heater member may be present in the cavity in which the liquid is to be inserted and/or in the support defining the cavity and/or in the wall and/or on the wall and/or in the chamber.

Preferably, the heater member may be present in the cavity in which the liquid is to be inserted.

In an embodiment, the device may be axisymmetric. In an embodiment, the device may have at least two walls, each of the walls being for applying pressure against a distinct part for bonding.

In an embodiment, the device may include a member for limiting the movement of the wall so as to be able to control the movement of part or all of the wall during application of the liquid.

The wall may present the above-described characteristics applicable to the wall for which the shape of the inside face is not modified during application of the liquid.

In an embodiment, the device may include an impermeable membrane covering the wall, the impermeable membrane possibly being as described above.

BRIEF DESCRIPTION OF THE DRAWINGS

Other characteristics and advantages of the invention appear from the following description of particular implementations of the invention, given as non-limiting examples, and with reference to the accompanying drawings, in which.

DETAILED DESCRIPTION OF IMPLEMENTATIONS

Figure 1:
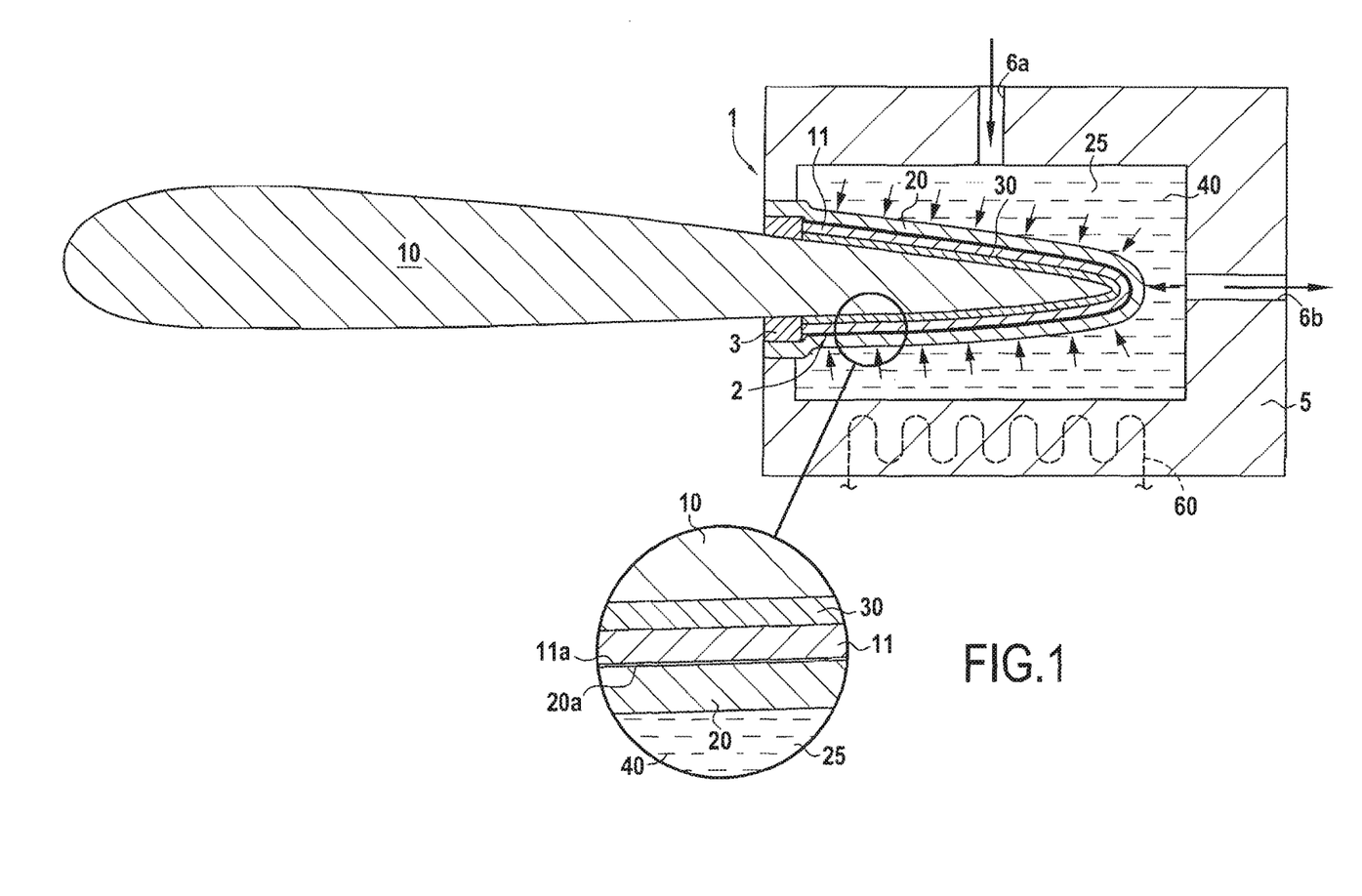
FIG. 1 is a diagrammatic and fragmentary view showing an example of the adhesive bonding method of the invention.

FIG. 1 shows an implementation of a method of the invention for adhesively bonding parts. This implementation uses a device 1 comprising a chamber 2 in which two parts 10 and 11 for bonding together are present. A first part 11 is situated facing the inside face 20a of the wall 20 defining the chamber 2. A layer of adhesive 30 is present between the parts 10 and 11 and is in contact with both of them. The first part 11 is present between the adhesive layer 30 and the wall 20. The inside face 20a of the wall 20 is situated beside the chamber 2. The chamber 2 is also defined by a sealing gasket 3.

As shown, only a fraction of the second part 10 onto which the first part 11 is to be adhesively bonded is present inside the chamber 2. In the example shown, the second part 10 is a turbine engine blade and the first part 11 is an element that is to constitute a leading edge once it has been put into place. By way of example, the turbine engine blade may be made of composite material and may comprise carbon fiber reinforcement densified with an epoxy matrix. The element 11 for constituting a leading edge may be made of metal.

It would not go beyond the ambit of the present invention for the parts for bonding together both to be made of composite material, each comprising carbon fiber reinforcement densified by an epoxy matrix. The parts for bonding together may also comprise one or more sandwich materials of honeycomb or foam type. In the ambit of methods of the invention, it is also possible to bond together a plurality of parts, each being made of metal, or indeed of glass, of wood, or of ceramic, for example.

The wall 20 is situated between the chamber 2 and a cavity 25 defined by a support 5 on which the parts 10 and 11 are present. As shown, a liquid 40 is inserted into the cavity 25 via a liquid inlet orifice 6a. It is also possible for a liquid outlet orifice 6b to be present in order to discharge the liquid 40 once the bonding method has terminated. As shown, the liquid inlet and outlet orifices 6a and 6b may be made in the support 5. The device 1 also includes a liquid injection device (not shown) for inserting the liquid 40 into the cavity 25. In the example shown, the support 5 forms a wall of the rigid cavity 25 defining said cavity 25. In the example shown, the support 5 does not deform while the liquid is being applied against the wall 20. Once the liquid is applied, it remains stationary in order to apply a hydrostatic pressure on the parts 10 and 11 for bonding together.

In the implementation shown in FIG. 1, the shape of the inside face 20a of the wall 20 becomes modified after the liquid 40 is inserted into the cavity 25 so as to have the same shape as the part 11. After the liquid 40 has been applied, the inside face 20a of the wall 20 takes on the same shape as the face 11a of the part 11 that is situated facing the wall 20. Under such circumstances, the wall 20 may be a flexible wall made of silicone. The shape of the wall 20 may come close to the shape of the leading edge 11 for bonding prior to application of the liquid and may then take on the shape of the leading edge 11 once the liquid is applied.

The liquid 40 applies pressure on the parts 10 and 11 through the wall 20. The liquid 40 imposes hydrostatic pressure on the parts 10 and 11 and on the adhesive layer 30 assembled therewith. The liquid 40 applies pressure over all of the adhesive layer 30. In other words, the liquid 40 applies pressure on all of the surface over which the adhesive layer 30 extends.

In an implementation, the adhesive power of the adhesive 30 may be increased by heating as a result of the adhesive 30 cross-linking. Under such circumstances, the device 1 may include a heater member 60, e.g. constituted by a plurality of heater resistance elements. By way of example, the heater member 60 may be present in the support 5 as shown. When a heating step is performed, this may be carried out while the parts 10 and 11 are subjected to the pressure applied by the liquid 40.

In variants that are not shown, the heater member may be present in the cavity and/or in the wall and/or on the wall and/or in the chamber. In another variant, the device does not have a heater member and the adhesive is heated by a heater member external to the device.

In a variant that is not shown, a part may be bonded on an outlet guide vane using a wall that, prior to the liquid being applied thereagainst, has the same shape as the part for bonding.

In the implementations shown in FIGS. 2, 3, and 4 that are described in detail below, the inside face 20a of the wall 20 is situated facing all of the parts for bonding together (i.e. not only placing the first part).

Figure 2:
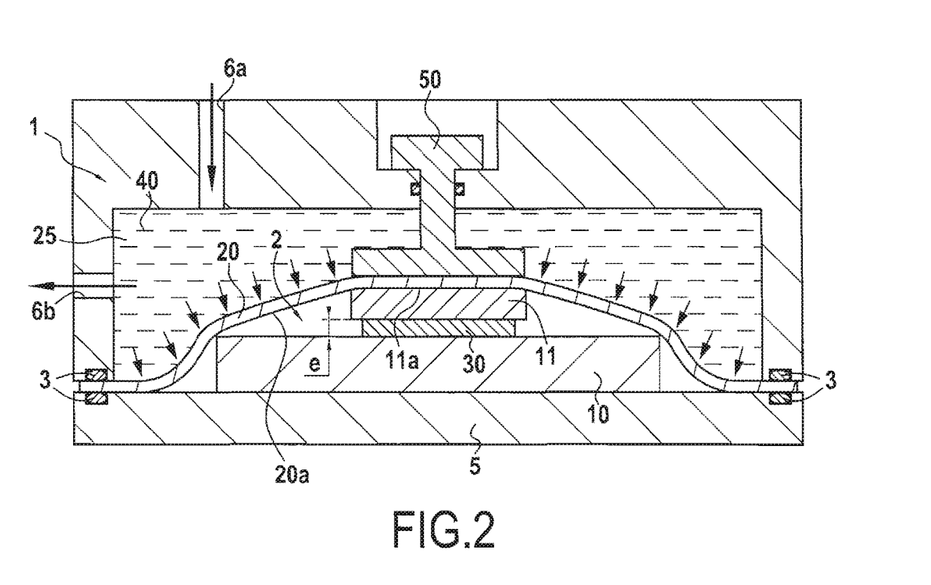
FIGS. 2, 3, 4, 5A, 5B, and 6 are diagrammatic and fragmentary views showing various implementations of the adhesive bonding method of the invention.

FIG. 2 shows a variant implementation of the bonding method of the invention. In the implementation of FIG. 2, all of the parts 10 and 11 for bonding together are present in the chamber 2. The chamber 2 is defined between a support 5 on which the parts 10 and 11 are present and the wall 20. The liquid 40 inserted into the cavity 25 is present against the wall 20 on its side opposite from the chamber 2 and it imposes a pressure on the parts 10 and 11. In this implementation, the shape of the inside face 20a of the wall 20 changes after the liquid 40 has been inserted into the cavity 25 so as to take on the same shape as the part 11. After application of the liquid 40, the inside face 20a of the wall 20 takes on the same shape as the face 11a of the part 11 that is situated facing the wall 20.

The device 1 includes a pull rod 50 enabling movement of the wall 20 to be limited. By way of example, the pull rod 50 may be fitted to the wall 20. The pull rod 50 serves advantageously to control the thickness e of the adhesive layer 30.

Figure 2A:
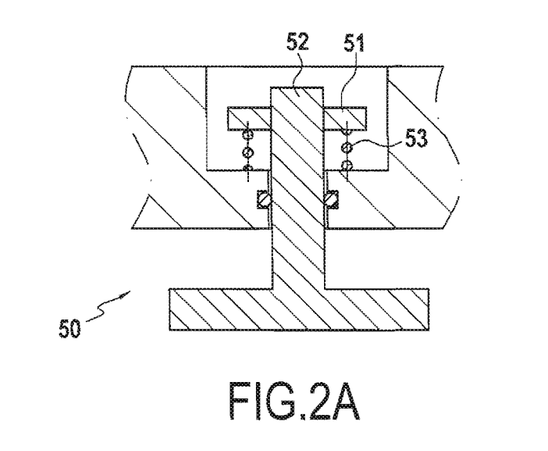
FIG. 2A is a diagrammatic and fragmentary view showing a detail of FIG. 2.

FIG. 2A shows a detail of FIG. 2. As shown in FIG. 2A, the pull rod 50 comprises a cap 51 screwed onto a threaded bar 52. By way of example, a system 53 comprising a spring or Belleville washers acts automatically to control the downwards and upwards movement of the pull rod 50. The pull rod 50 may also be controlled by applying extra pressure, e.g. by means of an external actuator (not shown). The use of such an external actuator may advantageously enable parts to be adhesively bonded at different pressures.

Figure 3:
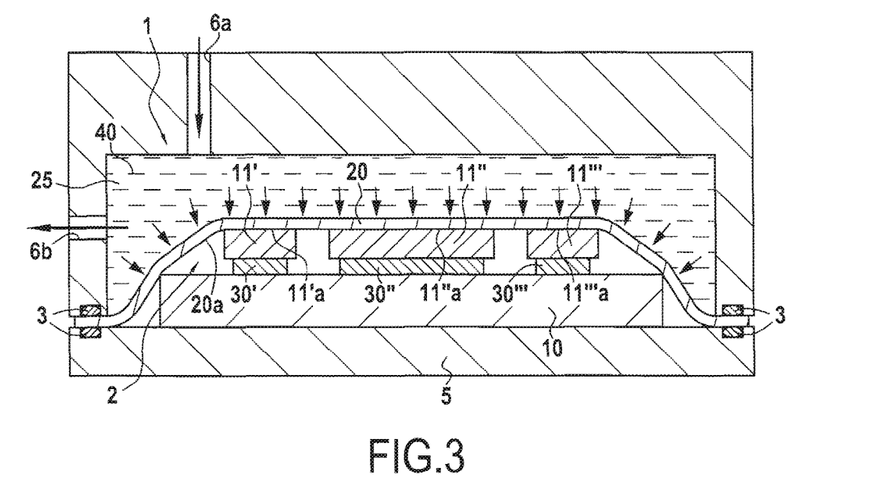
Figure 4:
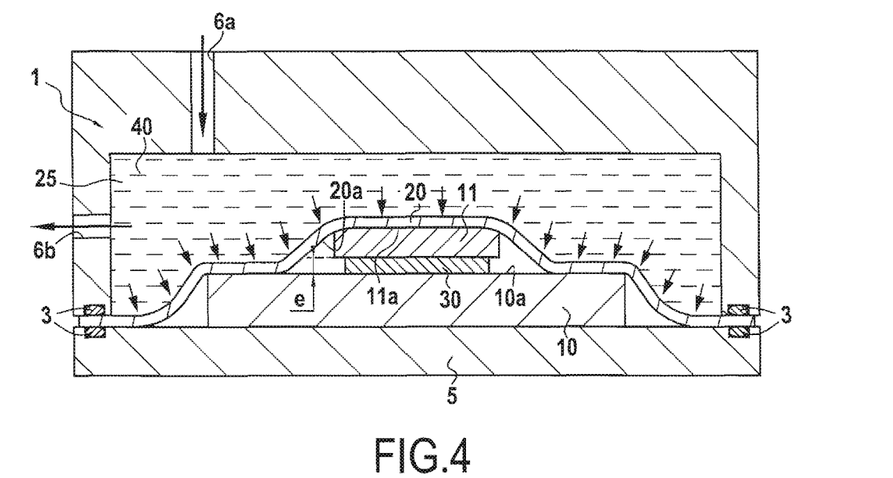

FIG. 3 shows another implementation in which one of the parts 10 for bonding is coated in a plurality of adhesive layers 30', 30", and 30'". As shown, the adhesive layers 30', 30", and 30'" are not in contact with one another. Each adhesive layer 30', 30", and 30'" is present between two parts for bonding together. Specifically:

the part 11' is for bonding to the part 10 using the adhesive layer 30';

the part 11" is for bonding to the part 10 by using the adhesive layer 30"; and the part 11'" is for bonding to the part 10 by using the adhesive layer 30'".

As shown, after the liquid 40 has been applied, the inside face 20a of the wall 20 situated facing the parts 11', 11", and 11'" takes on the same shape as the faces 11'a, 11"a, and 11'"a of the parts 11', 11", and 11'".

The parts 11', 11", and 11'" for bonding may be identical or different. The adhesive layers 30', 30", and 30'" may comprise identical adhesive. In a variant, the adhesive layers 30', 30", and 30'" may comprise different adhesives, e.g. each constituting a respective different adhesive. In a variant that is not shown, the part 10 is replaced by a plurality of parts, each of which is for bonding to a distinct part. In the implementation shown in FIG. 4, the wall 20 is configured so that:

after application of the liquid 40, its inside face 20a has the same shape as the face 11a of the first part 11 situated facing the wall 20; and so that after application of the liquid 40, its inside face 20a has the same shape as a portion of the face 10a of the second part 10 against which the first part 11 is to be bonded.

In this implementation, the wall is sufficiently flexible to enable the shape of its inside face 20a to be modified after the liquid 40 has been applied so as to take on both the shape of the first part 11 and the shape of the second part 10.

Figures 5A, 5B:
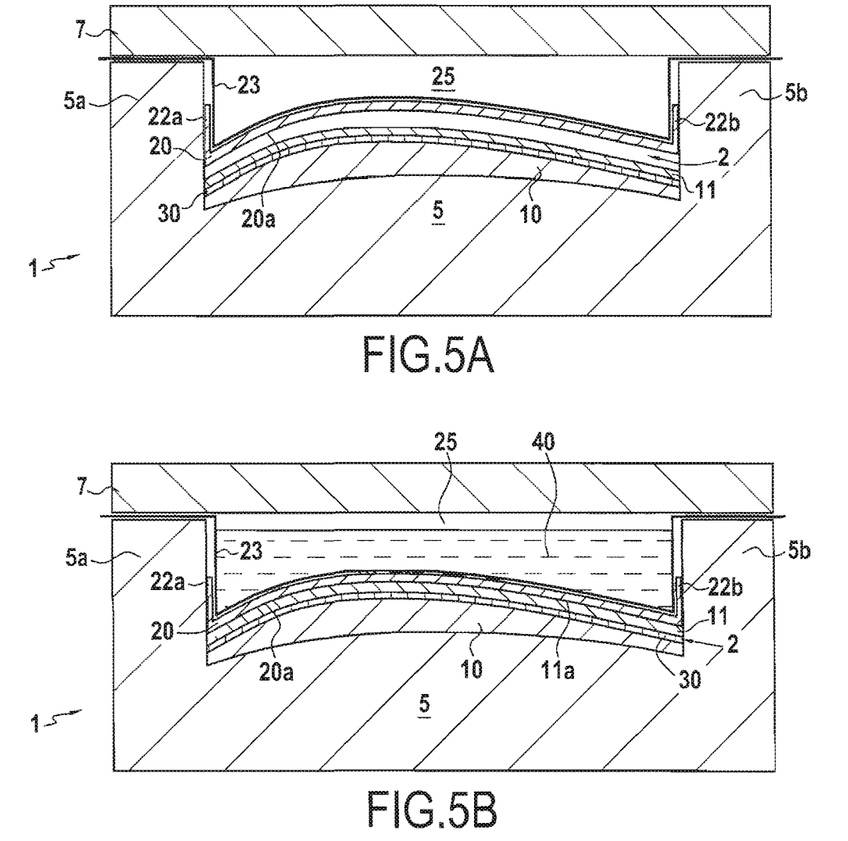

FIGS. 5A and 5B show a variant implementation of a method of the invention. In this implementation, the wall 20 is suitable for retaining its shape during application of the liquid 40.

As shown, the chamber 2 in which the two parts 10 and 11 for bonding together are present is defined by the support 5 and the wall 20. The chamber 2 is also defined by side walls 5a and 5b of the support 5.

The cavity 25 in which the liquid is to be inserted is defined by the side walls 5a and 5b of the support 5. A cover 7 is present in order to close the cavity 25.

The wall 20 may be moved relative to the support 5 when sufficient pressure is exerted thereon. In the implementation shown, the wall 20 presents two ends 22a and 22b that co-operate with the side walls 5a and 5b. These ends 22a and 22b co-operate with the side walls 5a and 5b to guide the wall 20 relative to the support 5. By way of example, these ends 22a and 22b may constitute upstanding edges, as shown. It would not go beyond the ambit of the present invention for the ends 22a and 22b to be in some other form and suitable for co-operating with the walls 5a and 5b so as to enable the wall 20 to move relative to the support 5.

As shown in FIG. 5A, the device 1 may also have an impermeable membrane 23 covering the wall 20, and the wall 20 may be situated between the chamber 2 and the impermeable membrane 23, and the liquid 40 may be applied against the impermeable membrane 23 on the side opposite from the chamber 2.

FIG. 5B shows the device 1 of FIG. 5A after the liquid 40 has been inserted into the cavity 25. As shown, applying the liquid 40 does not change the shape of the wall 20, since the wall is sufficiently rigid for its shape to be unaffected by the application of the liquid 40. In particular, the inside face 20a of the wall 20 conserves its shape while the liquid 40 is being applied.

Thus, applying the liquid 40 causes the wall 20 to move towards the support 5 without changing the shape of the wall 20. As shown, the ends 22a and 22b of the wall 20 come closer to the support 5 as a result of the liquid 40 being applied. The wall 20 presents the same shape throughout the time the bonding method is being performed. In particular, the shape of the inside face 20a of the wall 20 corresponds to the shape of the first part 11. As shown, the inside face 20a of the wall 20 has the same shape as the face 11a of the first part 11 that is situated facing the wall 20.

The wall 20 maintains isostatic pressure on the parts 10 and 11 because of the presence of the liquid 40 bearing against the wall 20.

Once the liquid 40 has been applied against the wall 20, it is possible to perform a heating step seeking to increase the adhesive power of the adhesive 30 by polymerizing it. When such a heating step is performed, the liquid 40 may be unaffected thereby. In other words, the liquid 40 need not change state during the step c).

Figure 6:
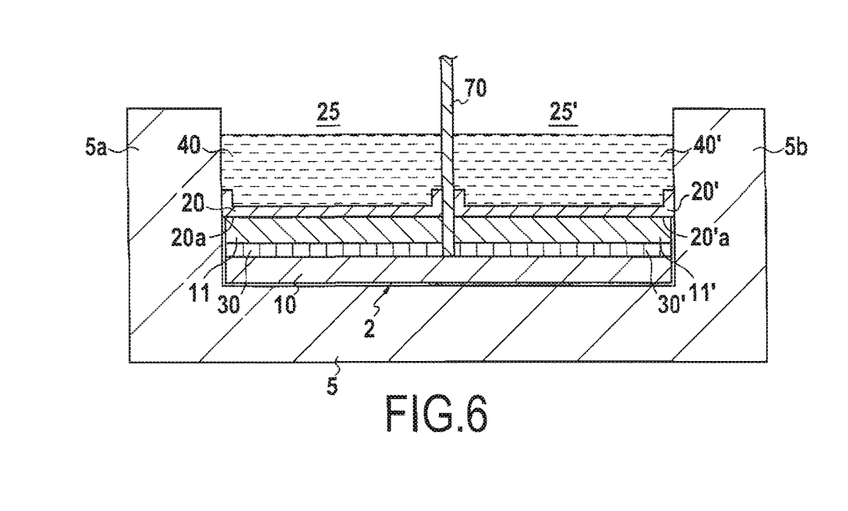

FIG. 6 shows another implementation of the method of the invention. In order to obtain the arrangement shown in FIG. 6, a part 10 is initially placed on a support 5. Two layers of adhesive 30 and 30' are then applied on the part 10. Two parts 11 and 11' for bonding are then placed on the respective adhesive layers 30 and 30'. A partition 70 is then put into position. Two walls 20 and 20' are then put into position, the walls 20 and 20' co-operating with the partition 70 and with the side walls 5a and 5b. Liquids 40 and 40' are then inserted into each of the cavities 25 and 25'.

The liquids 40 and 40' enable the parts 11 and 11' to be bonded to the part 10 by using two distinct walls 20 and 20'. In the ambit of methods of the invention it is possible to bond parts while using different liquids that are applied in the two cavities 25 and 25'.

EXAMPLE

There follows an operating protocol for bonding a titanium leading edge onto a composite material blade comprising carbon fiber reinforcement densified by a PR520 epoxy resin, the bonding being performed within tooling made of steel.

The leading edge, the film of epoxy adhesive, and the blade are initially assembled together.

The resulting assembly is placed in a chamber defined by a shaped silicone membrane.

The assembly is heated to 160° C. and oil is applied against the membrane. The applied oil serves to exert a pressure of 3 bars and to enable the membrane to bear against the leading edge.

The assembly as put under pressure in this way is subjected to a temperature of 180° C. for 2 hours in order to bond the leading edge to the blade.

The term "comprising/containing a" should be understood as "comprising/containing at least one".

The term "lying in the range . . . to . . . " should be understood as including the limits.

The invention claimed is:

1. A method of bonding together at least two parts, the method comprising:

assembling together at least two parts and at least one adhesive layer, the adhesive being configured so that its adhesive power increases on heating as a result of it polymerizing, at least one of the parts being made of composite material or of metal, the adhesive layer being present, after assembly, between the parts, the assembled together parts and the adhesive being present in a chamber defined by a wall, the wall having an inside face situated facing a first part present between the adhesive layer and the wall, the first part being intended to be bonded to a second part and only a fraction of the second part being present inside the chamber;

applying a hydrostatic pressure on the parts by contacting a stationary liquid with a side of the wall opposite from the chamber, the wall being configured so that, at least after application of the hydrostatic pressure, its inside face has the same shape as the first part; and bonding the parts with the hydrostatic pressure applied thereto.

2. The method according to claim 1, wherein the inside face of the wall conserves its shape during application of the liquid.

3. The method according to claim 1, wherein the shape of the inside face of the wall is modified during application of the liquid.

4. The method according to claim 1, further comprising the step of heating the adhesive layer.

5. The method according to claim 4, wherein a heater member performing heating is present in a cavity into which the liquid is inserted.

6. The method according to claim 1, wherein the chamber is defined between the wall and a support defining a cavity into which the liquid is inserted.

7. The method according to claim 1, wherein a plurality of adhesive layers are present on at least one of the parts, the adhesive layers not being in contact with one another and each adhesive layer being present between two parts for bonding together.

8. The method according to claim 1, wherein the wall moves and in that the movement of all or part of the wall is controlled by a member for limiting the movement of the wall.

9. The method according to claim 1, wherein the parts are made of composite material and comprise fiber reinforcement together with a matrix.

10. The method according to claim 1, wherein the first part is made of metal and a second part to which the first part is to be bonded is made of composite material and comprises fiber reinforcement together with a matrix.

11. The method according to claim 1, wherein the parts are made of metal.

12. The method according to claim 1, wherein the first part is an element for constituting, once bonded, a leading edge or a trailing edge, and a second part onto which the first part is to be bonded is a turbine engine blade.

13. A device comprising:

a wall defining a chamber, the chamber defining an inside volume in which at least two parts are to be bonded together by means of at least one adhesive layer; and a liquid injection device configured to apply a liquid against the wall, the device being configured so that applying the liquid against the wall does not modify the shape of the inside face of the wall situated beside the chamber and generates sufficient pressure on the wall to move the wall and reduce the inside volume of the chamber, wherein the device further includes a heater member, the heater member being present in a cavity in which the liquid is to be inserted.

* * * * *

UNITED STATES PATENT AND TRADEMARK OFFICE
CERTIFICATE OF CORRECTION

| | | |
|---|---|---|
| PATENT NO. | : 10,137,640 B2 | Page 1 of 1 |
| APPLICATION NO. | : 15/101754 | |
| DATED | : November 27, 2018 | |
| INVENTOR(S) | : Thierry Godon et al. | |

It is certified that error appears in the above-identified patent and that said Letters Patent is hereby corrected as shown below:

On the Title Page

Item (71), the Applicant's name is incorrect. Item (71) should read:
-- (71) Applicant: SAFRAN AIRCRAFT ENGINES, Paris (FR) --

Signed and Sealed this
Fourth Day of June, 2019

Andrei Iancu
*Director of the United States Patent and Trademark Office*